July 20, 1926.
C. A. BONZER
1,593,484
CALCULATING DEVICE
Filed Oct. 23, 1922  3 Sheets-Sheet 1
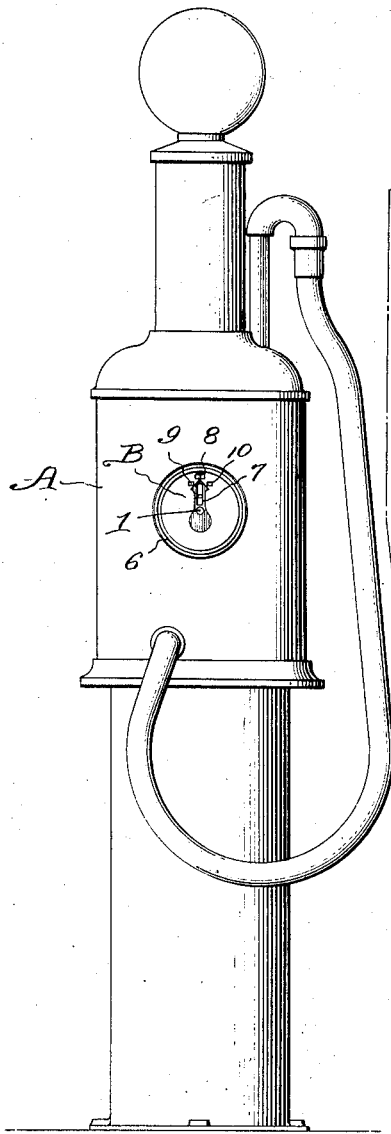
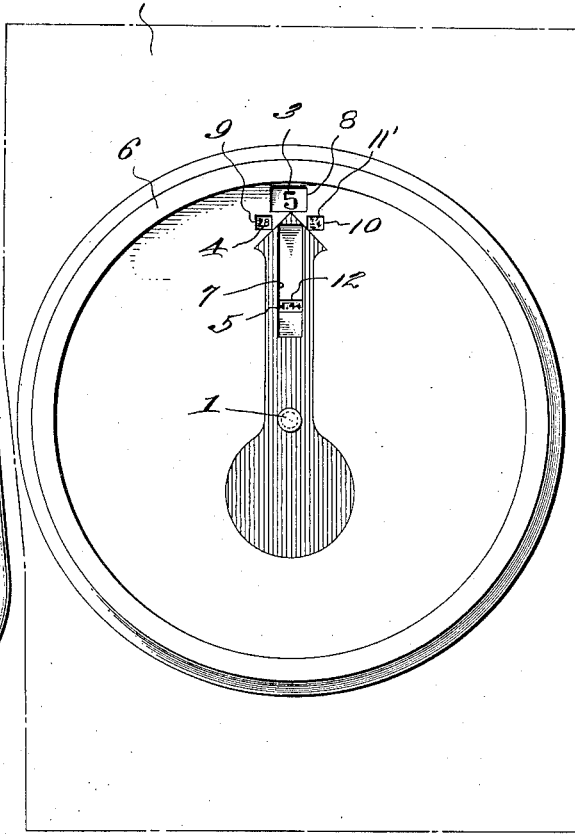

July 20, 1926.

C. A. BONZER

CALCULATING DEVICE

Filed Oct. 23, 1922     3 Sheets-Sheet 2

1,593,484

C. A. Bonzer,
INVENTOR

BY Victor J. Evans
ATTORNEY

WITNESSES

Figures 5, 6:
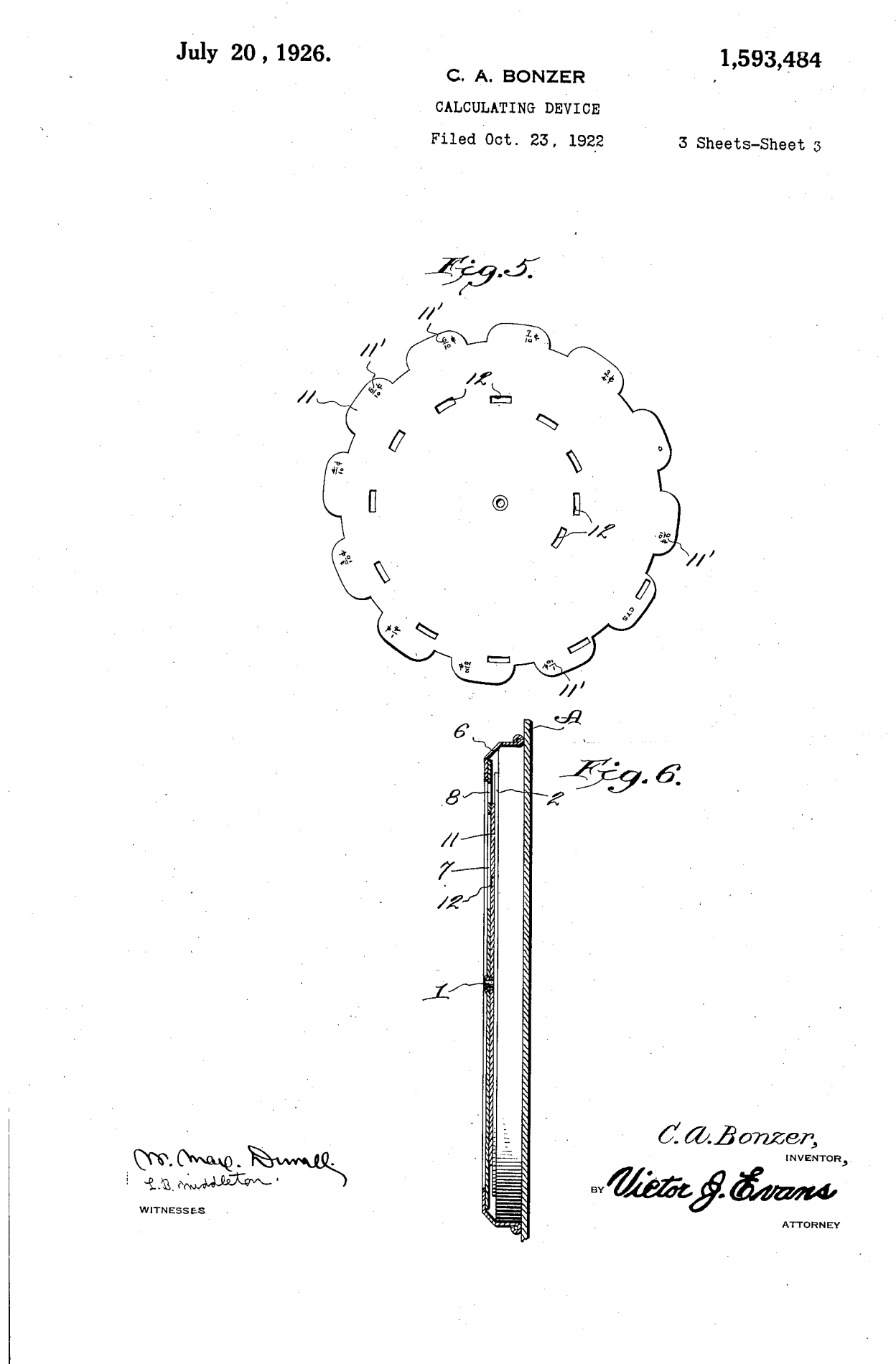

July 20, 1926.

C. A. BONZER

CALCULATING DEVICE

Filed Oct. 23, 1922

C. A. Bonzer,
INVENTOR,

BY Victor J. Evans
ATTORNEY

WITNESSES

Patented July 20, 1926.

1,593,484

UNITED STATES PATENT OFFICE.

CLARENCE A. BONZER, OF LIDGERWOOD, NORTH DAKOTA.

CALCULATING DEVICE.

Application filed October 23, 1922. Serial No. 596,382.

This invention relates to a register for liquid dispensing apparatus, the general object of the invention being to provide means for registering the amount discharged, the price at which the liquid is sold and the total amount to be paid by the customer.

Another object of the invention is to provide a series of interchangeable discs so that the device can be used with a dispensing apparatus, the contents of which vary in price.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a view of a gasoline dispensing apparatus showing my invention in use.

Figure 2 is an enlarged view of the device itself.

Figures 4–6 are detail views.

Figure 3:
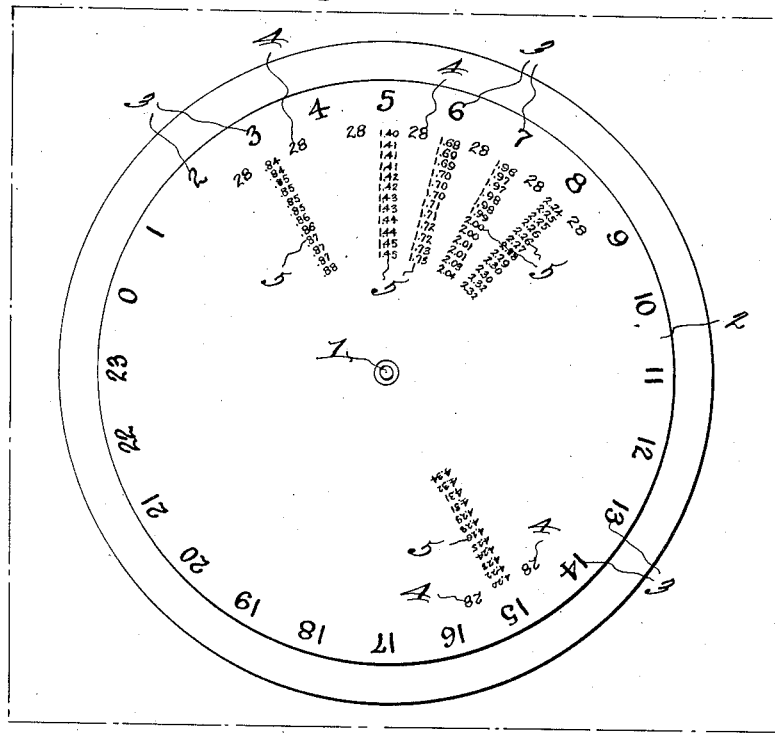
Figure 3 is a view with the cover removed.
Figure 4:
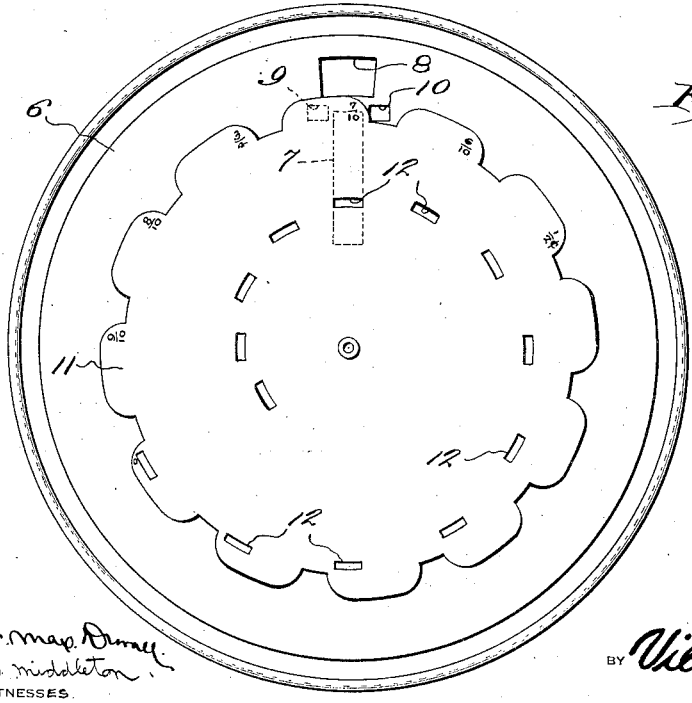

In these views A indicates the pump which is provided with the usual registering means B for indicating the amount of gasoline being discharged from the pump. In carrying out my invention I remove the indicator finger from the shaft 1 of the indicator and detachably secure thereto a disc 2 which has arranged thereon the numerals 3 for indicating the amount of gasoline being discharged from the pump, the numerals 4 for indicating the cost per gallon and the radial rows of numerals, as shown at 5, for indicating the total cost of the amount discharged. I also provide a cover 6 for the device which contains the slot 7, the large hole 8 and the two small holes 9 and 10, the hole 8 acting as a window for the numerals 3, the hole 9 acting as a window for the numerals 4, the slot 7 exposing the rows of numerals 5 and the hole 10 the fractions 11' carried by a disc 11 pivotally secured to the cover and having slots 12 therein which are arranged at varying distances from the center of the disc and which are designed to expose certain numerals in the rows 5 through the slot 7 to indicate the total cost of the amount delivered by the pump at one operation thereof. The fractional indications 11' are arranged on both faces of spaced radially disposed tabs 5' carried by the disc 11 so that by reversing the disc the device can be used for a great number of different prices. The device would also comprise a plurality of discs 2 containing different figures so that if the cost per gallon should change a new disc containing the proper numerals would be substituted for the old disc and if the cost should be a fraction the disc 11 would be adjusted to bring the proper indications opposite the window 10.

From the above it will be seen that the device will register the number of gallons being discharged from the pump, the cost of each gallon in whole numbers and fraction and the total cost of the full amount discharged by the pump in one operation. While the device is mainly designed for use on gasoline pumps it will of course be understood that it can be used in other situations. It will also be understood that the device can be made to register in quarts and pints if desired.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

In combination with a calculating device and its register shaft, a disk adapted to be connected with the shaft and having thereon numerals indicating the amount being discharged from the pump, the price thereof and the total cost of the amount being discharged from the pump, a cover for the device having windows therein for exposing the numerals on the disk, a second disk carried by the cover and having openings therein for exposing the numerals indicating the total cost and radially arranged spaced tabs on the perimeter of the last mentioned disk and having indications for indicating the fractional cost of the liquid being dispensed.

In testimony whereof I affix my signature.

CLARENCE A. BONZER.